May 21, 1968 G. M. BROWN 3,384,425
HYDROSTATIC BEARING
Filed Nov. 22, 1965 2 Sheets-Sheet 1

Inventor
Graham Maurice Brown
Watson, Cole, Grindle + Watson
Attorneys

May 21, 1968

G. M. BROWN 3,384,425

HYDROSTATIC BEARING

Filed Nov. 22, 1965

Inventor
Graham Maurice Brown

Watson, Cole, Grindle & Watson
Attorneys

United States Patent Office 3,384,425
Patented May 21, 1968

3,384,425
HYDROSTATIC BEARING
Graham Maurice Brown, Hellidon, Daventry, England, assignor to Charles Churchill & Company Limited, Birmingham, England, a British company
Filed Nov. 22, 1965, Ser. No. 509,026
Claims priority, application Great Britain, Dec. 7, 1964, 4,975/64
6 Claims. (Cl. 308—5)

ABSTRACT OF THE DISCLOSURE

This invention relates to improvements in hydrostatically lubricated slideway bearings of the double acting type wherein one of the relatively sliding members carries hydrostatic thrust pads which are free to rock about axes parallel to the direction of sliding movement and in which the pads at one side of the sliding members are subject to a pre-load towards the other member.

---

Figure 1:
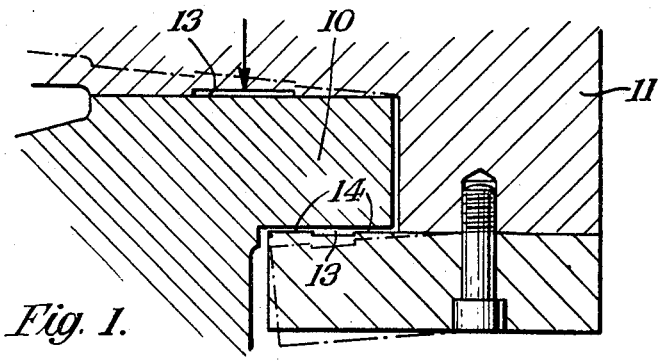

This invention relates to hydrostatically lubricated slideway bearings for use in machine tools and for other purposes.

Where a loaded member is arranged to slide in a slideway and it is desired to resort to hydrostatic lubrication, one of the relatively movable members carries a series of hydrostatic thrust pads, each formed with a pocket adjacent the sliding surface of the other member, and lubricant is fed under pressure from a constant pressure source to the pocket of each pad through a hydraulic restrictor and flows from the pocket along the sliding surface of the other member through the narrow gap between the lands of the pad and said other member.

The main advantage of hydrostatically lubricated slideway bearings is that they eliminate the root cause of "stick-slip" in that the effective friction-velocity characteristic no longer contains a negative slope zone. Wear is also virtually eliminated and feed power levels are often reduced.

In order to take maximum advantage of these characteristics it is desirable to make as high as possible the effective stiffness of the film of lubricant between the lands of each pad and the cooperating bearing surface.

In many instances the slideway bearing is double-acting in order to enable it to accommodate both positive-going and negative-going loads. In such a case the pads are normally mounted on opposed surfaces of the female member, which need not necessarily be parallel, on opposite sides of the male member, but they may as an alternative be mounted on the male member.

The double-acting bearing has the advantage that its effective stiffness may be made relatively high compared with that of the single-acting bearing without resorting to compensating devices other than simple capillary type restrictors. The effects on its performance of elastic distortion in the members comprising the bearing surfaces of the double-acting bearing, are invariably more severe than in the case of the single-acting bearing however and the present invention is concerned with the provision of means for dealing with this problem.

The invention provides a double-acting hydrostatically lubricated slideway bearing, comprising relatively slidable male and female members, pads mounted on opposite sides of one of said members, each pad being formed with a pocket adjacent the cooperating sliding surface of the other member, means for feeding lubricant under pressure from a constant pressure source to the pocket of each pad through a hydraulic restrictor so that liquid may flow from the pocket along the sliding surface of the other member through narrow gaps between the pad and the other member, the pads being free to rock in relation to the member carrying them about axes parallel to the direction of sliding movement, and means for applying a preload towards the other member to the pads at one side of the member carrying the pads.

Figure 2:
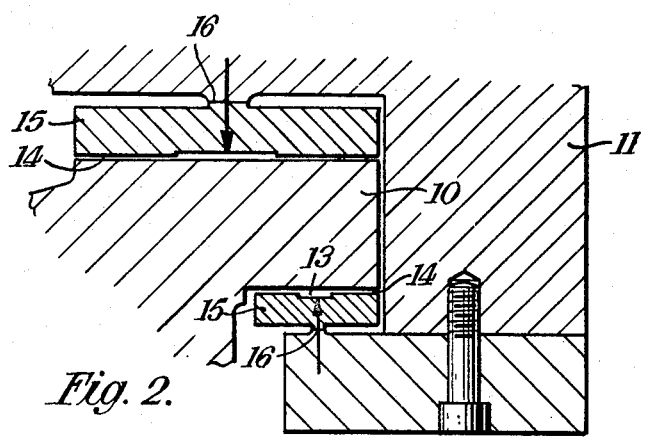
Figure 3:
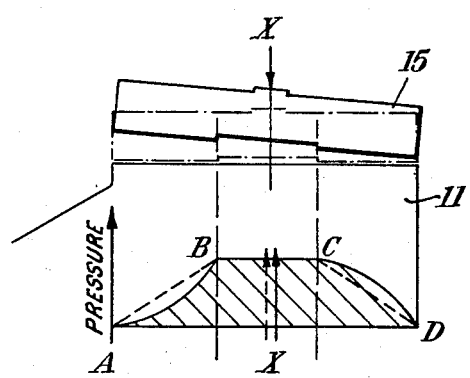
Figure 4:
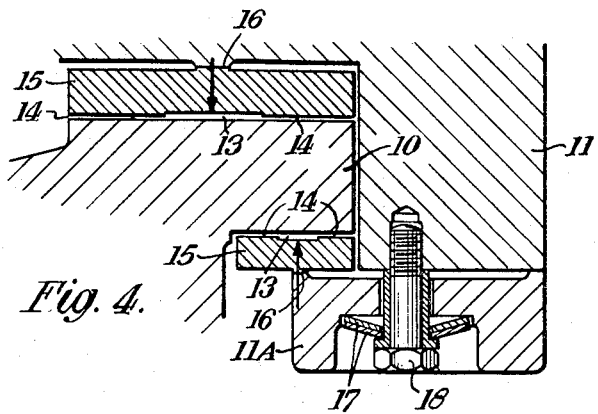
Figure 5:
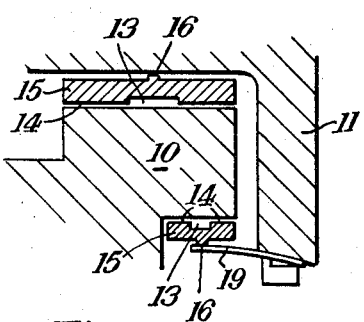
Figure 6:
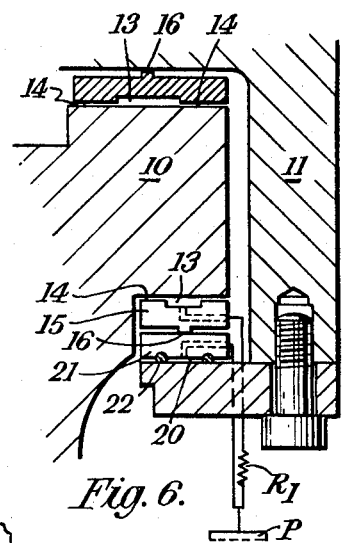
Figure 8:
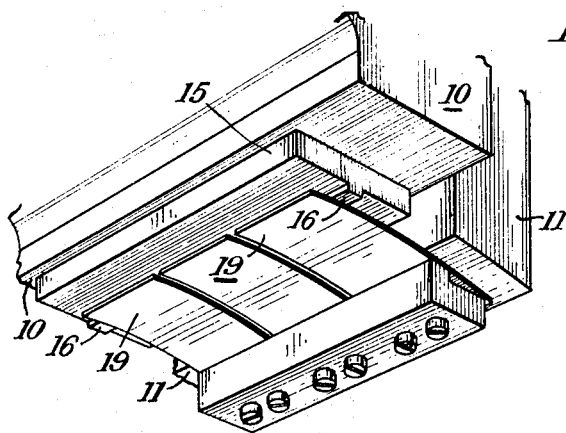
Figure 7:
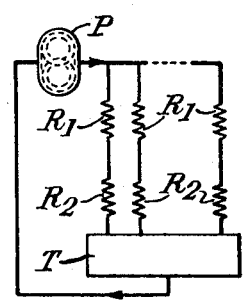

The invention will now be further described with reference to the accompanying diagrammatic drawings, in which:

FIG. 1 is a section through a conventional double-acting hydrostatically lubricated bearing of the rigid type, FIG. 2 is a section through a bearing according to the invention with self-aligning pads, FIG. 3 is a view illustrating the effect of tilting of the pads, FIGS. 4, 5 and 6 are sectional views showing alternative mechanism for pre-loading the pads, FIG. 7 is a diagram showing a typical pressurizing system, and FIG. 8 is an underside view of a bearing pre-loaded as indicated in FIG. 5.

Like reference characters indicate like parts throughout the figures.

In the conventional slideway bearing shown in FIG. 1, the male member 10 is embraced by a female member 11 which can slide in relation to the male member in a direction perpendicular to the plane of the drawing and carries a series of pads, shown integral with the female member, and each having a lubricant pocket 13. Two only of these pads are shown in the drawing. Oil is supplied under pressure, from a constant pressure source, through an individual hydraulic restrictor to each of the pockets 13 and flows through a second restrictor, shown in the case of the lower pad by the narrow gaps 14 between the lands of the lower pad and the male member, back to the suction side of the pressurizing system.

A typical pressurizing system is shown in FIG. 7, in which oil is supplied from a pump P through each of the pockets 13 in parallel to a tank T, from which oil is returned to the suction side of the pump. In FIG. 7, the hydraulic restrictor upstream of each pocket is indicated at $R_1$ and the second restrictor constituted by the aforesaid narrow gaps 14 is indicated at $R_2$.

When such a slideway bearing is employed in a machine tool the elastically induced deformations generally take the form shown, greatly exaggerated, by the dash lines in FIG. 1. The effects of this distortion may be considered to be of two distinct types, one resulting in the oil films becoming wedge-shaped instead of parallel and the other resulting in the mean thickness of the oil film being increased. The former effect may be described as being rotational in nature and the latter, translational.

The effect of the rotational component of distortion on the shape of the oil film is nullified in accordance with the invention, as shown in FIG. 2, by mounting the pads 15 so that they can rock in relation to the female member about axes parallel to the direction of sliding movement; each pad having on its outer surface a narrow face 16 which abuts against a corresponding face of the female member 11. In practice, the pads 15 may be held in position by shouldered screws, the heads of which are fitted into central recesses in the bearing faces of the pads and abut against O-ring, and the shanks of which extend with clearance through holes in the pads. If desired the bearing faces of the pads may have a facing of plastic material to prevent scoring of the male member in the event of sliding movement when there is no lubricant pressure available.

FIG. 3 illustrates the variation in pressure distribution, indicated by the curve ABCD, between the lands of the pad and the male member in the event of distortion of the female member. As will be seen this exerts a self-righting couple, indicated by the arrows XX, on the pad tending to return it to parallelism with the male member.

Mere provision for rocking of the pads, as shown in FIG. 2, does not counteract the translational component of distortion and although the oil films will be appreciably parallel the actual oil film thickness may be considerably higher than that measured when the members are in an unstrained state. This increase in oil film thickness may give rise to such an increase in oil flow rate that the amount of energy dissipated in the bearing would give rise to unacceptable levels of thermally induced distortion.

FIG. 4 shows how this translational component of distortion may be nullified by pre-loading the lower pads 15. This is effected by springs 17, interposed between a portion 11A of the female member which carries the lower pads 15 and a bolt 18 screwed into the main portion of the female member, which enable the lower pads 15 to provide a pre-load force dependent upon the compression of the springs but will not provide any relative stiffness between the two structural members whereas in the "rigid" system (FIG. 1) both oil films contribute to the overall stiffness of the system. Oil film stiffness may however be regarded as being almost inversely proportional to the oil film thickness. This is particularly so when other parameters are adjusted to give rise to maximum stiffness conditions. It is found in practice therefore that the stiffness achieved from the one oil film in the compensated system (FIG. 4) is greater than the total stiffness obtained from the two oil films in the former case being appreciably lower than those in the latter case.

An alternative form of pre-loading is shown in FIG. 5. In this case each of the lower pads 15 is mechanically unrestrained in the direction normal to the bearing surface and is maintained in equilibrium in this direction by the force induced by a leaf spring 19 and the hydrostatic thrust between the bearing surfaces at the gaps 14. The leaf spring 19 applies to the pad 15 a definite force depending upon the deflection of the spring, with the result that the pad 15 does not provide any relative stiffness between the members 10 and 11. If desired, and as shown in FIG. 8, a plurality of leaf springs 19, disposed side by side, may be utilized to support the pad 15. This assists in compensation for lack of parallelism in the male member 10 and variations in the magnitude of the distortion of the female member 11 arising from local variations in its strength.

FIG. 6 illustrates how a lower pad 15 may be given a hydraulic pre-load. The pad is mounted to rock at 16 on a floating strip 21. Oil at the pressure of a constant pressure source P is supplied to a gap 20 between the undersurface of the strip 21 and the female member 11 and retained by an O-ring seal 22. The strip 21 thus imposes on the pad 15 a predetermined force which is independent of the width of the gap 20. This nullifies effects of out of parallelism of the male member 10 and variations in the magnitude of the distortion of the female member 11 arising from local variations in its strength. Also the pad 15 will not provide any relative stiffness between the members 10 and 11.

What I claim as my invention and desire to secure by Letters Patent is:

1. A double-acting hydrostatically lubricated slideway bearing, comprising relatively longitudinally slidable male and female members, pads mounted on opposite sides of one of said members, each pad having a planar face formed with a pocket adjacent the cooperating sliding surface of the other member, means feeding lubricant under pressure from a constant pressure source to the pocket of each pad through a hydraulic restrictor so that liquid may flow from the pocket along the sliding surface of the other member through narrow gaps between the pad and the other member, means mounting the pads on the member carrying them so that said pads may rock in relation to said member about axes parallel to the direction of relative sliding movement of said male and female members, and means applying a pre-load towards the other member to the pads at one side of the member carrying the pads.

2. A bearing as claimed in claim 1, in which the pads are mounted on the female member and said members have opposed planar sliding surfaces.

3. A bearing as claimed in claim 1, in which the pre-load is applied to the pads by springs.

4. A bearing as claimed in claim 3, in which the springs are leaf springs.

5. A bearing as claimed in claim 1, in which the pre-load is applied hydraulically to the pads.

6. A bearing as claimed in claim 5, in which each pad is mounted to rock on a floating strip supported on the female member by lubricant supplied under constant pressure to a gap between the floating strip and the female member.

References Cited

UNITED STATES PATENTS

| | | | |
|---|---|---|---|
| 466,645 | 1/1892 | Wood | 308—9 |
| 315,776 | 4/1885 | Hallock | 308—160 |
| 1,117,504 | 11/1914 | Kingsbury | 308—160 |
| 1,445,188 | 2/1923 | Wadsworth | 308—160 |
| 2,037,326 | 4/1936 | Howarth | 308—160 |
| 2,785,022 | 3/1957 | Lakey | 308—160 |
| 3,052,505 | 9/1962 | Trotter | 308—160 |
| 3,053,583 | 9/1962 | Shaw | 308—9 |
| 3,132,908 | 5/1964 | Grotzinger | 308—160 |
| 3,137,530 | 6/1964 | Kohler | 308—5 |

FOREIGN PATENTS

| | | |
|---|---|---|
| 876,171 | 8/1961 | Great Britain. |

MARTIN P. SCHWADRON, *Primary Examiner.*

L. L. JOHNSON, *Assistant Examiner.*